UNITED STATES PATENT OFFICE.

KARL WESSEL, OF ST. PAUL, MINNESOTA.

VARNISH AND PAINT REMOVER.

1,181,361.　　　　　Specification of Letters Patent.　　Patented May 2, 1916.

No Drawing.　　Application filed August 5, 1915.　Serial No. 43,758.

*To all whom it may concern:*

Be it known that I, KARL WESSEL, a citizen of the United States, residing at St. Paul, in the county of Ramsey and State of Minnesota, have invented certain new and useful Improvements in Varnish and Paint Removers; and I do hereby declare the following to be a full, clear, and exact description of the invention, such as will enable others skilled in the art to which it appertains to make and use the same.

Particularly, my invention has for its object to provide a highly efficient and improved varnish and paint remover; and to such ends, generally stated, the invention consists of the novel process and novel combination of ingredients hereinafter described and defined in the claims.

The nature of the product will be made clear from the following description of the process by which it is made: As a first step of the process, I take, for example, one thousand gallons of water, one thousand pounds of vegetable fiber, (preferably flax straw or tow), thirty pounds of caustic soda and two pounds of linseed oil soap, and boil the same for about ten hours in a closed digester of a form commercially well known. This so-called first step of the process is one that is usually performed in the preparation of flax tow and similar fibrous materials, preliminary to the use thereof, for various commercial purposes, such as the manufacture of rugs and other flax products. The said process is also performed in the preparation of flax and other vegetable fibers for use in making coarse articles, such as heat insulating material. As a second step of the process, I take approximately seventy five per cent. of digester liquor obtained by the above process and commingle the same with approximately twenty per cent. of caustic soda and five per cent. of alcohol, preferably wood alcohol. The liquid product that is thus obtained is capable of a wide range of use for the removal of various adhesive materials, and particularly, it has been found to be highly efficient for use as a varnish and paint remover. When weakened or diluted by water, it is efficient for the removal of dirt and grease from varnished and painted surfaces, such as furniture, railway coaches, street cars, automobiles, and the like. In practice, I have found that the above described liquid can be made at a very small per cent. of the cost of making the well known commercial varnish and paint removers, and furthermore, it is more highly efficient than any of the said commercial varnish and paint removers that I have been able to find on the market.

I have found that the use of a small amount of linseed oil, soap and alcohol increases the efficiency of the paint and varnish remover, and that the additional supply of caustic soda is highly desirable unless the digester liquor itself happens to be very strong in that element. However, highly efficient paint and varnish removers may be produced even when these elements just mentioned are omitted in whole or in part.

What I claim is:

1. The process of making a varnish and paint remover, which consists in boiling together vegetable fiber, an alkali, linseed oil soap and water, and in adding alcohol to the liquid thus obtained.

2. The process of making a varnish and paint remover, which consists in boiling together vegetable fiber, an alkali, linseed oil soap and water, and in adding alcohol and additional alkali to the liquid thus obtained.

3. The process of making a liquid of the character above described, which consists in boiling together vegetable fiber, water, caustic soda and a relatively small amount of linseed oil soap, and in commingling a large percentage of the liquor thus obtained with a much smaller per cent. of caustic soda and a still smaller per cent. of alcohol.

4. The process of making a liquid of the character above described, which consists in boiling together vegetable fiber, water, caustic soda and linseed oil soap, and then adding to the liquid thus obtained a quantity of caustic soda and alcohol.

5. The process of making a paint and varnish remover, which consists in boiling together flax straw, an alkali and water, and in adding alcohol to the liquid thus obtained.

6. A paint and varnish remover having as its main body portion, a digester liquid obtained in the treatment of flax straw.

7. A paint and varnish remover having as its main body portion, a digester liquor obtained in the treatment of a vegetable fiber with an alkali, water, linseed oil soap and a quantity of alcohol and caustic soda added to said digester liquor.

In testimony whereof I affix my signature in presence of two witnesses.

KARL WESSEL.

Witnesses:
BERNICE G. WHEELER,
HARRY D. KILGORE.